US012403394B2

(12) United States Patent
Blok

(10) Patent No.: US 12,403,394 B2
(45) Date of Patent: Sep. 2, 2025

(54) INTENT-BASED MODELS FOR USE IN SELECTING ACTIONS IN VIDEO GAMES

(71) Applicant: Electronic Arts Inc., Redwood City, CA (US)

(72) Inventor: Hendrik Blok, Coquitlam (CA)

(73) Assignee: ELECTRONIC ARTS INC., Redwood City, CA (US)

( * ) Notice: Subject to any disclaimer, the term of this patent is extended or adjusted under 35 U.S.C. 154(b) by 401 days.

(21) Appl. No.: 18/130,359

(22) Filed: Apr. 3, 2023

(65) Prior Publication Data

US 2023/0233935 A1 Jul. 27, 2023

Related U.S. Application Data

(63) Continuation of application No. 16/879,336, filed on May 20, 2020, now Pat. No. 11,648,472.

(51) Int. Cl.
*A63F 13/47* (2014.01)
*A63F 13/67* (2014.01)

(52) U.S. Cl.
CPC .............. *A63F 13/47* (2014.09); *A63F 13/67* (2014.09)

(58) Field of Classification Search
CPC .................................. A63F 13/47; A63F 13/67
See application file for complete search history.

(56) References Cited

U.S. PATENT DOCUMENTS

2020/0293952 A1* 9/2020 Siddiqui ........... G06F 18/24323
2021/0362054 A1 11/2021 Blok \* cited by examiner

*Primary Examiner* — Thomas H Henry
(74) *Attorney, Agent, or Firm* — Gray Ice Higdon

(57) ABSTRACT

This specification describes a computer-implemented method of generating an intent-based model for use in selecting actions in a video game. The method comprises initializing a graph comprising a plurality of nodes. Each node of the plurality of nodes represents a state of an entity in the video game. The method further comprises adding one or more edges to the graph. Each edge of the one or more edges represents a transition from a first state to a second state. The method further comprises determining, for each node of the plurality of nodes, a distance to each other node, comprising performing a path-finding algorithm on the graph. The method further comprises determining one or more outcome nodes. Each outcome node represents an outcome state of the entity. The method further comprises scoring the one or more outcome nodes, comprising, for each outcome node, determining a score based on an outcome of the outcome node. The method further comprises scoring the plurality of nodes of the graph. Scoring the plurality of nodes of the graph comprises, for each node of the plurality of nodes, and for each outcome out of a set of outcomes, determining whether one or more outcome nodes for the outcome are immediately available from the node; and when one or more outcome nodes for the outcome are immediately available from the node, scoring the outcome for the node using the scores of the one or more outcome nodes. The method further comprises, for each node of the graph, and for each outcome out of the set of outcomes, determining a distance from the node to a highest scoring outcome node for the outcome.

20 Claims, 5 Drawing Sheets

INTENT-BASED MODELS FOR USE IN SELECTING ACTIONS IN VIDEO GAMES

BACKGROUND

Video games often involve a player performing a complex sequence of actions to reach a desired goal. Video games which are enjoyed by experienced players usually have a depth of choices at different states of the game, which may be difficult to navigate for inexperienced players.

SUMMARY

In accordance with a first aspect, this specification describes a computer-implemented method of generating an intent-based model for use in selecting actions in a video game. The method comprises initializing a graph comprising a plurality of nodes. Each node of the plurality of nodes represents a state of an entity in the video game. The method further comprises adding one or more edges to the graph. Each edge of the one or more edges represents a transition from a first state to a second state. The method further comprises determining, for each node of the plurality of nodes, a distance to each other node, comprising performing a path-finding algorithm on the graph. The method further comprises determining one or more outcome nodes. Each outcome node represents an outcome state of the entity. The method further comprises scoring the one or more outcome nodes, comprising, for each outcome node, determining a score based on an outcome of the outcome node. The method further comprises scoring the plurality of nodes of the graph. Scoring the plurality of nodes of the graph comprises, for each node of the plurality of nodes, and for each outcome out of a set of outcomes, determining whether one or more outcome nodes for the outcome are immediately available from the node; and when one or more outcome nodes for the outcome are immediately available from the node, scoring the outcome for the node using the scores of the one or more outcome nodes. The method further comprises, for each node of the graph, and for each outcome out of the set of outcomes, determining a distance from the node to a highest scoring outcome node for the outcome.

In accordance with a second aspect, this specification describes a system comprising: one or more processors; and a memory, the memory storing computer readable instructions that, when executed by the one or more processors, cause the processor to perform operations. The operations comprise receiving an indication of an intent to transition an entity of a video game to an outcome state, the outcome state corresponding to an outcome out of a set of outcomes. The operations further comprise determining a current state of the entity. The operations further comprise determining one or more transitions that are immediately available from the current state. The operations further comprise determining, using an intent-based model: a score for the current state; a current distance from the current state to an outcome state corresponding to the intent; and for each of the one or more transitions, a transition distance from a state transitioned to by the transition to an outcome state corresponding to the intent. The operations further comprise selecting a transition such that the transition distance of the transition is less than or equal to the current distance.

In accordance with a third aspect, this specification describes a computer-readable medium storing instructions, which when executed by a processor, cause the processor to: initialize a graph comprising a plurality of nodes, each node of the plurality of nodes represents a state of an entity in the video game; add one or more edges to the graph, wherein each edge of the one or more edges represents a transition from a first state to a second state; determine, for each node of the plurality of nodes, a distance to each other node, comprising performing a path-finding algorithm on the graph; determine one or more outcome nodes, wherein each outcome node represents an outcome state of the entity; score the one or more outcome nodes, comprising, for each outcome node, determining a score based on an outcome of the outcome node; score the plurality of nodes of the graph, comprising, for each node of the plurality of nodes, and for each outcome out of a set of outcomes: determine whether one or more outcome nodes for the outcome are immediately available from the node; and when one or more outcome nodes for the outcome are immediately available from the node, score the outcome for the node using the scores of the one or more outcome nodes; and for each node of the graph, and for each outcome out of the set of outcomes, determine a distance from the node to a highest scoring outcome node for the outcome.

BRIEF DESCRIPTION OF THE DRAWINGS

Certain embodiments of the present invention will now be described, by way of example, with reference to the following figures.

DETAILED DESCRIPTION

Figure 1:
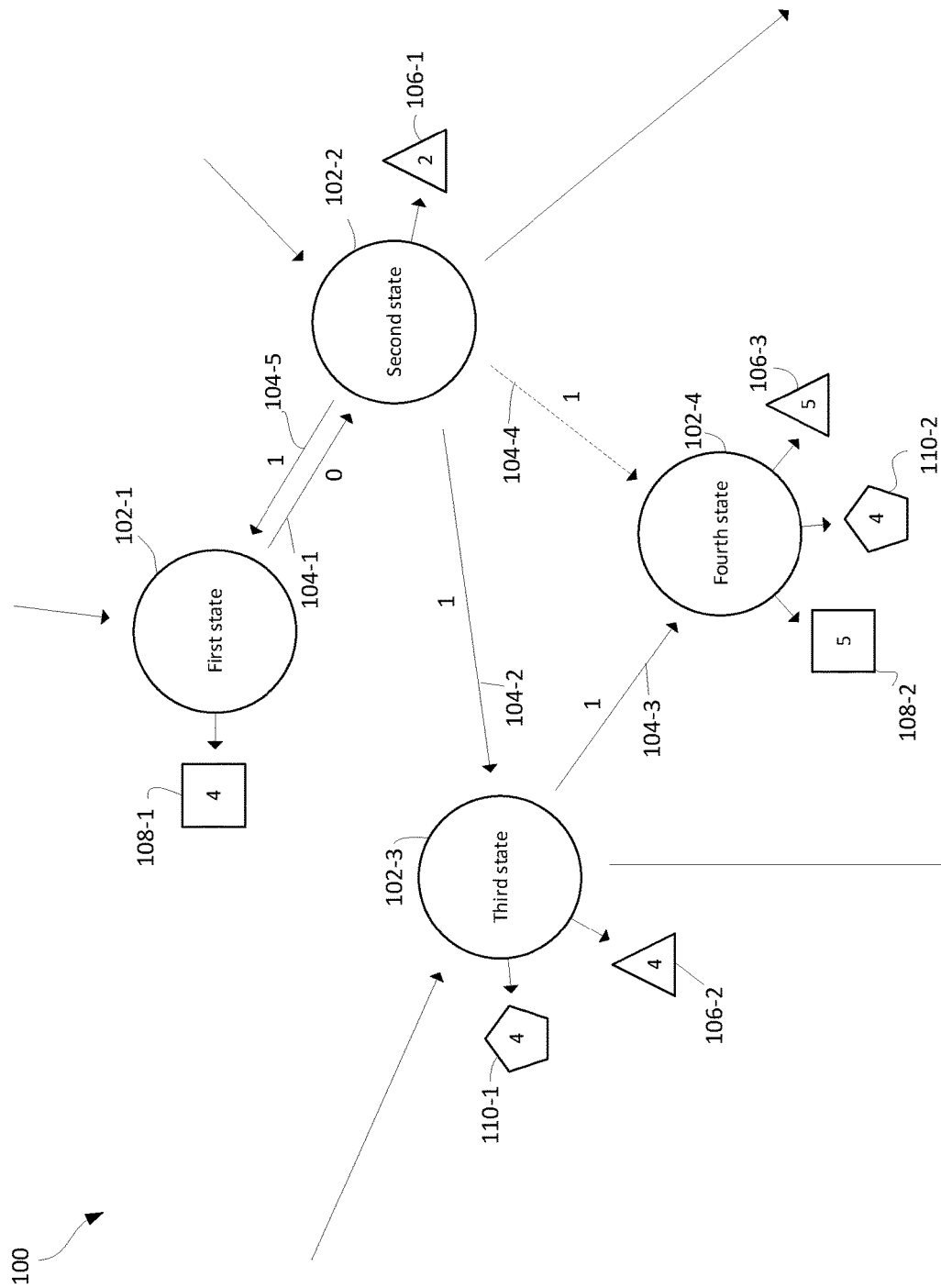
FIG. 1 shows an example of a portion of a graph used for generating an intent-based model for use in selecting actions in a video game.

This specification describes methods and systems for selecting actions in a video game using an intent-based model. Methods and systems described in this specification enable players to reach a desired outcome without having to manually perform each of the individual actions used to reach the desired outcome. For example, in many video games, players may have to choose from a large number of different actions, which actions may differ depending on the entity/character they are controlling and the current state of the entity/character. An outcome may be reached in different ways, with outcomes reached from particular states being more valuable (e.g. more strategically beneficial) than those reached from other states. In addition, some actions from states may only be available in a few game contexts, which players may not be aware of. As such, players may face difficulties in selecting which actions to perform to reach the best outcome and/or the closest outcome.

The methods and systems described in this specification enable players of the video game to select a small number of controls (e.g. a button press and/or moving a stick in a particular direction) corresponding to an intent to reach a desired outcome, by determining a sequence of actions which takes into account any contextual actions that may become available over time. The methods and systems described in this specification may also be used in a tutorialized system which teaches players which controls they should have selected to perform the actions used to reach the desired outcome. In addition, the methods and systems described in this specification may be used by entities which are not controlled by players (e.g. an AI of the video game) in order to select actions.

The described systems and methods may be implemented in any appropriate video game. For example, the described systems and methods may be used in a fighting game to select grappling movements from various grappling positions and for various characters. A grappling position of a character may be represented by a state, with the actions that a player may choose at a point in time being the various grappling movements available for the character from the current grappling position. Contextual actions may be actions that are only available when other factors are taken into account, such as how close two fighters are, and the stamina of the fighters.

In this example, the different outcomes may be outcomes such as those reached from performing a "submission" action, a "ground and pound" action, or a "get up" action. As these outcomes may be reached from a number of different grappling positions available from the current grappling position, and certain outcomes may be more effective in winning the fight than others, a desired outcome might be the best outcome or the closest outcome. For example, the player may select controls to indicate an intent to reach the best "ground and pound" outcome, and a sequence of actions may be determined to reach the best "ground and pound" outcome from the current grappling position. Similarly, the player may select further controls to indicate an intent to reach the closest "submission" outcome, and a sequence of actions may be determined to reach the closest "submission" outcome from the current grappling position.

As another example, the described systems and methods may be used in action-adventure games which may involve, for example, a player driving to different destinations in a city. An intersection of two or more roads may be represented by a state, with the actions that a player may choose at a point in time being the various roads available from the current intersection. Contextual actions may be those available when shortcuts are available, such as when an obstacle clears a path that may be used to reach a destination.

In this example, the different outcomes may be outcomes such as those reached from driving to different destinations, e.g. police stations, banks, and safehouses. As these destinations may be reached by a variety of routes, and certain destinations may be more valuable than others, a desired outcome might be the best outcome or the closest outcome. For example, the player may select controls to indicate an intent to reach the best police station, and a sequence of roads may be determined to reach the best police station from the current intersection. Similarly, the player may select further controls to indicate an intent to reach the closest safehouse, and a sequence of roads may be determined to reach the closest safehouse from the current intersection.

This specification also describes systems and methods for generating intent-based models for use in selecting actions in a video game. For example, an intent-based model may be generated by performing a path-finding algorithm on a graph. The described systems and methods may enable the generation of computationally efficient intent-based models and obviate the need to perform path-finding algorithms at runtime. For example, the graph may comprise transitions corresponding to actions that are always available for an entity. Values determined from performing the path-finding algorithm on the graph (such as scores of states, scores of best outcomes on paths from states, distances to best outcomes on paths from states, and/or distance to closest outcomes on paths from states) may be stored as part of the intent-based model for use in runtime when a player is playing the video game. At runtime, actions may be selected by comparing these values for states which are currently available from the current state, which may include states reached by contextual actions in addition to states reached by actions that are always available for the entity. By obviating the need to perform path-finding algorithms at runtime, actions can be selected by a linear time algorithm that determines which states can be reached from the current state.

FIG. 1 shows an example of a portion of a graph 100 used for generating an intent-based model for use in selecting actions in a video game. The graph 100 shown in FIG. 1 shows an example of a graph determined during the method described in relation to FIG. 2. The graph 100 represents which actions, or transitions, can be taken from different states of the video game, and the value in reaching different outcome states. Although graph 100 shows a directed graph, it will be appreciated that the methods described herein may be applied to undirected graphs. For example, an undirected graph may be converted into a directed graph by replacing undirected edges with parallel directed edge pairs.

The graph 100 comprises a plurality of nodes 102-1, 102-2, 102-3, 102-4. Each node 102-1, 102-2, 102-3, 102-4 of the graph 100 represents a state of an entity in a video game. The entity may be a character, a vehicle, or any other appropriate component of a video game.

The graph 100 further comprises a plurality of edges 104-1, 104-2, 104-3, 104-4, 104-5. Each edge 104-1, 104-2, 104-3, 104-4, 104-5 from a node represents a transition from a first state to a second state. For example, edge 104-1 represents a transition from a state corresponding to node 102-1 to a state corresponding to node 102-2. Each edge 104-1, 104-2, 104-3, 104-4, 104-5 is weighted, for example edge 104-1 has a weight of 0 and edge 104-2 has a weight of 1. A weight of an edge may be determined based on whether the transition can be blocked, e.g. by another player. For example, a weight of 1 may indicate that the transition can be blocked, whereas a weight of 0 may indicate that the transition is an instant transition. The weight of an edge corresponds to the distance between the two nodes connected by the edge.

Edges 104-1, 104-2, 104-3, 104-5 represent transitions which are always available for the entity. Edge 104-4 represents a contextual transition. Contextual transitions are transitions that depend on a current context of the video game and are ones that are not always available for the entity from a state. At runtime, if certain conditions are satisfied, an entity in the second state corresponding to node 102-2 may be able to transition directly to the fourth state corresponding to node 102-4 without first transitioning to the third state corresponding to node 102-3. Contextual edge 104-4 may be removed from the graph 100 (or alternatively, not added to the graph 100 during building of the graph 100) during the method described in relation to FIG. 2.

FIG. 1 also shows a plurality of outcome nodes 106-1, 106-2, 106-3, 108-1, 108-2, 110-1, 110-2 for the graph 100. The plurality of outcome nodes represent outcome states which are immediately available from the state to which the outcome node is connected. For example, outcome node 108-1 being connected to node 102-1 represents that an outcome state is immediately available from a first state corresponding to node 102-1. Outcome nodes 106-1, 106-2, 106-3 represent outcome states for a first outcome denoted by a triangle in FIG. 1, outcome nodes 108-1, 108-2 represent outcome states for a second outcome denoted by a square in FIG. 1, and outcome nodes 110-1, 110-2 represent outcome states for a third outcome denoted by a pentagon in FIG. 1. Outcome nodes may be terminal nodes, e.g. endpoints.

Each outcome node has a respective score, for example outcome node 106-1 has a score of 2, and outcome node 110-2 has a score of 4. Each outcome node may be scored on a function that is specific to that outcome node. For example, an outcome node may be scored based on a level of the entity/character. As shown in FIG. 1, different outcome states for the same outcome may have different scores. For example, the triangle outcome state of outcome node 106-1 immediately available from the second state corresponding to node 102-2 has a score of 2 whereas the triangle outcome state of outcome node 106-3 immediately available from the fourth state corresponding to node 102-4 has a score of 5. The scores of outcome nodes are used to determine scores for the states from which an outcome node is immediately available, as will be described in relation to FIGS. 2 and 3.

In the example of a fighting game, the nodes 102-1, 102-2, 102-3, 102-4 may correspond to grappling positions of a fighter. For example, node 102-1 may represent a fighter being in a guard position, node 102-2 may represent the fighter being in a half-guard position, node 102-3 may represent the fighter being in a side control position, and node 102-4 may represent the fighter being in a full mount position.

A set of three outcomes may be given with the first outcome of outcome nodes 106 being a 'ground and pound' outcome, the second outcome of outcome nodes 108 being a 'submission' outcome, and the third outcome of outcome nodes no being a 'get up' outcome. In this example, outcome node 108-1 is a 'submission' outcome state representing a 'submission' outcome being immediately available from the dominant role of the guard position for the fighter, and outcome node 110-2 is a 'get up' outcome state representing a 'get up' outcome being immediately available from the full mount position for the fighter. The score of an outcome node may represent a value of the entity reaching the outcome state of the outcome node.

Each edge 104-1, 104-2, 104-3, 104-4, 104-5 may represent a grappling movement between two grappling positions. The weight of the edge may be determined based on whether the grappling movement can be blocked by an opponent. For example, edge 104-2 having a weight of 1 indicates that the grappling movement from the half-guard position to the side control position can be blocked by an opponent. Edge 104-4 is a contextual edge representing a contextual transition from the half-guard position to full mount position. Edge 104-4 may become available to the fighter in certain contexts of the fight, for example if the stamina of the opponent is sufficiently low.

Figure 2:
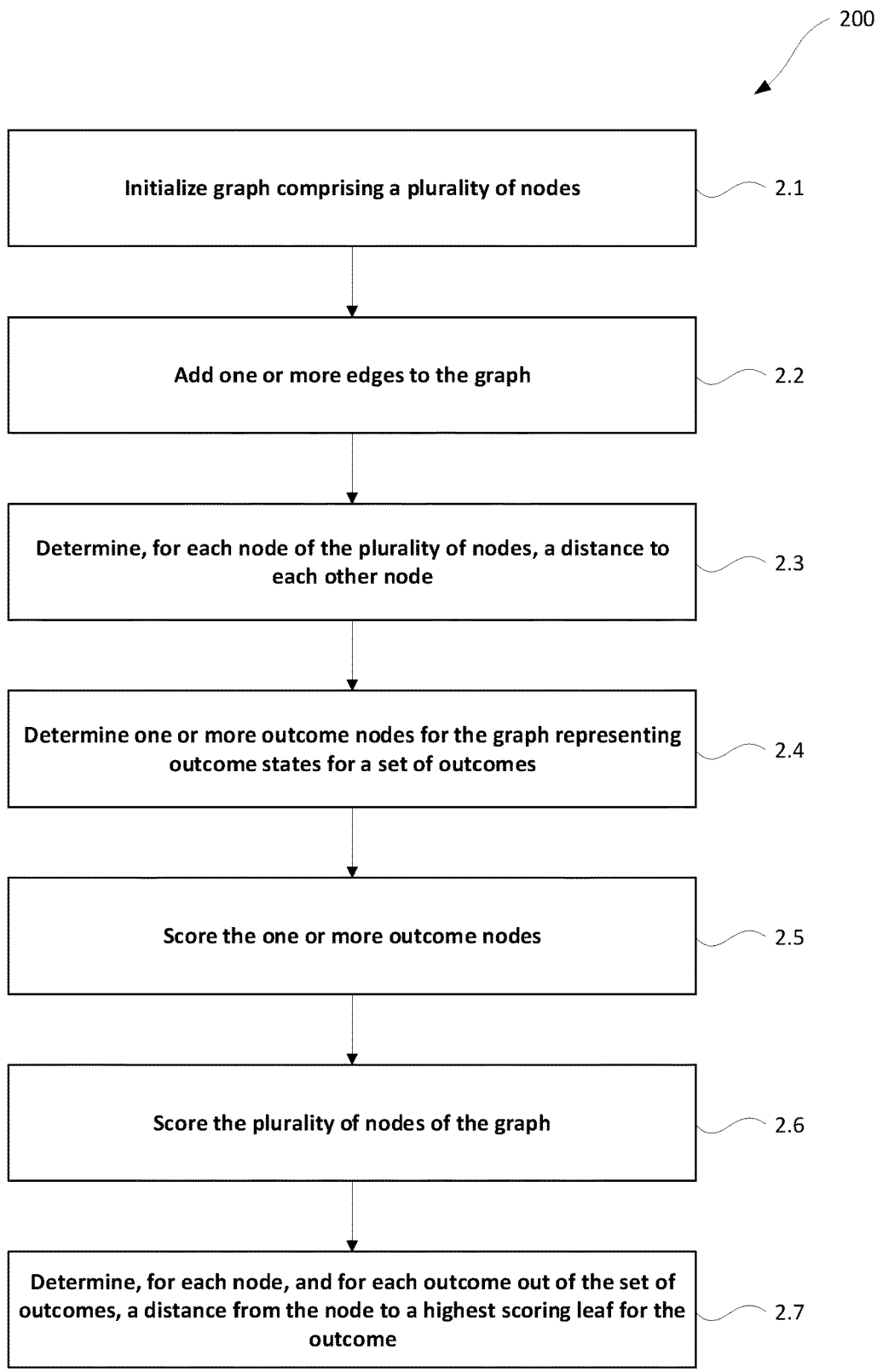
FIG. 2 shows a flow diagram of an example method of generating an intent-based model for use in selecting actions in a video game.

FIG. 2 shows a flow diagram of an example method 200 of generating an intent-based model for use in selecting actions in a video game. The below description will refer to elements of FIG. 1 for illustrative purposes.

In step 2.1, a graph comprising a plurality of nodes is initialized. Each node of the plurality of nodes represents a state of an entity in the video game. For example, the plurality of nodes may comprise the nodes 102-1, 102-2, 102-3, 102-4 described in relation to FIG. 1.

In step 2.2, one or more edges are added to the graph. Each edge of the one or more edges represents a transition from a first state to a second state. The method 200 may comprise determining that each transition of the one or more edges is a transition that is always available for the entity. The method 200 may comprise determining a weight for each edge in dependence on whether the transition can be blocked (e.g. blocked by another player). For example, the one or more edges may comprise the edges 104-1, 104-2, 104-3, 104-5 described in relation to FIG. 1. Edges corresponding to contextual transitions such as edge 104-4 described in relation to FIG. 1 may be absent from the one or more edges added to the graph.

In step 2.3, for each node of the plurality of nodes, a distance to each other node is determined. The method 200 comprises performing a path-finding algorithm on the graph. The graph may only include nodes 102-1, 102-2, 102-3, 102-4 and not outcome nodes 106-1, 106-2, 106-3, 108-1, 108-2, 110-1, 110-2 when performing the path-finding algorithm on the graph. The path-finding algorithm may use Dijkstra's algorithm to calculate distances between nodes. Dijkstra's algorithm is a known algorithm for finding the shortest paths between nodes of a weighted graph. The path-finding algorithm may use determined weights of edges in order to calculate distances between nodes. The path-finding algorithm may be used to determine paths from each node to each other node of a minimal distance.

In step 2.4, one or more outcome nodes are determined. Each outcome node corresponds to a state of the entity at an outcome out of a set of outcomes. For example, the one or more outcome nodes may comprise the outcome nodes 106-1, 106-2, 106-3, 108-1, 108-2, 110-1, 110-2 described in relation to FIG. 1.

In step 2.5, the one or more outcome nodes are scored. The method 200 comprises, for each outcome node, determining a score based on the outcome of the outcome node. Each outcome node may be scored using a function that is specific to that outcome node. The score of each outcome node represents a value of the entity reaching the outcome state of the outcome node.

In step 2.6, the plurality of nodes are scored. The scoring method comprises, for each node of the plurality of nodes, and for each outcome out of the set of outcomes: determining whether one or more outcome nodes for the outcome are immediately available from the node; and when one or more outcome nodes for the outcome are immediately available from the node, scoring the outcome for the node using the scores of the one or more outcome nodes.

Using the example described in relation to FIG. 1, a square outcome with a value of 4 is immediately available from node 102-1. Node 102-1 may be scored with a 4 for the square outcome. However, a triangle outcome is not immediately available from node 102-1, and so node 102-1 may be assigned a score of 0 for the triangle outcome. Similarly, node 102-1 may be assigned a score of 0 for the pentagon outcome as there is no pentagon outcome immediately available from node 102-1.

In step 2.7, for each node, and for each outcome out of the set of outcomes, a distance from the node to a highest scoring outcome node for the outcome is determined. The method 200 may further comprise, for each node of the graph, and for each outcome out of the set of outcomes, determining a distance from the node to a closest outcome node for the outcome. A distance from a node to an outcome node may be determined as the distance of a minimal distance path from the node to a node to which the outcome node is connected.

For example, the path-finding algorithm may be used to determine, for each node, a set of minimal distance paths beginning from the node and ending at another node. In order to determine a highest scoring outcome node for each outcome for the node, the scores of the nodes at the end of minimal distance paths may be compared. A highest scoring path for an outcome for the node may be selected as the path that ends in a node that is attached to an outcome node for the outcome with the highest score. A distance from the node to a highest scoring outcome node for the outcome may thus be determined as the distance along this highest scoring path.

In order to determine a closest outcome node for each outcome for the node, the distances of minimal distance paths may be compared. A closest path for an outcome for the node may be selected as the path with a least distance that ends in a node attached to an outcome node for the outcome with a non-zero score. A distance from the node to a closest outcome node for the outcome may thus be determined as the distance along this closest path.

The method 200 may comprise storing, for each node of the graph, and for each outcome out of the set of outcomes: (i) the score of the node, (ii) the score of the highest scoring outcome node for the outcome, and (iii) the distance from the node to the highest scoring outcome node for the outcome. The method 200 may comprise storing, for each node of the graph, and for each outcome out of the set of outcomes, the distance from the node to the closest outcome node for the outcome.

Figure 3:
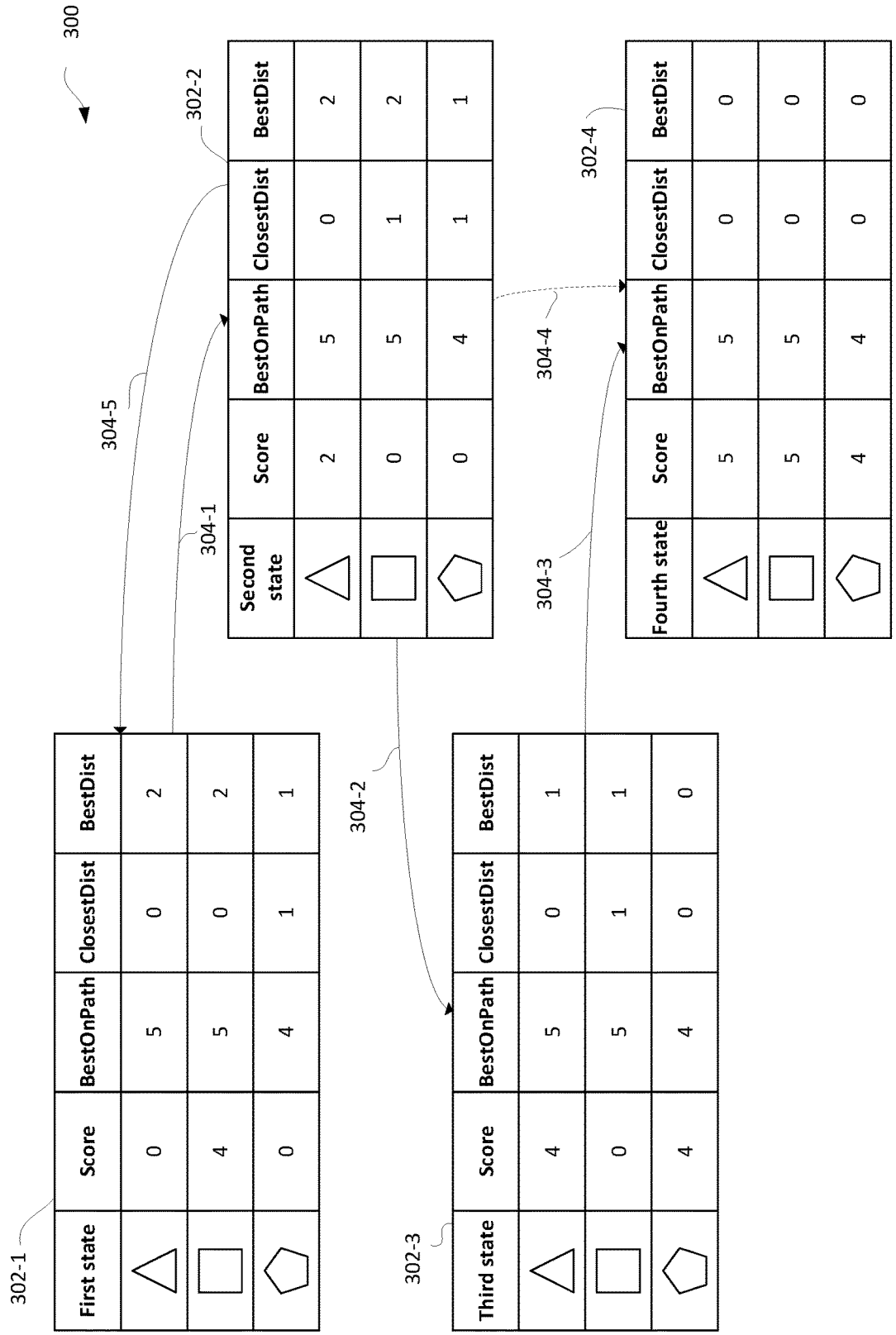
FIG. 3 shows an example method of selecting actions in a video game using an intent-based model.

FIG. 3 shows an example method of selecting actions in a video game using an intent-based model 300.

For illustrative purposes, the example of FIG. 3 corresponds to the example of FIG. 1, with the states 302-1, 302-2, 302-3, 302-4 of FIG. 3 corresponding to the nodes 102-1, 102-2, 102-3, 102-4 of FIG. 1, transitions 304-1, 304-2, 304-3, 304-4, 304-5 of FIG. 3 corresponding to the edges 104-1, 104-2, 104-3, 104-4, 104-5 of FIG. 3, and shows the same set of outcomes as shown in FIG. 1. As described in relation to FIG. 1, transition 304-4 is a contextual transition which may only be available in certain contexts of the video game.

The intent-based model 300 comprises a plurality of states 302-1, 302-2, 302-3, 302-4 and transitions between states 304-1, 304-2, 304-3, 304-4, 304-5. The intent-based model 300 comprises, for each state-outcome pair, a score for the pair denoted by 'Score', a value of a highest-scoring outcome node for the pair denoted by 'BestOnPath', a distance of a closest outcome node for the pair denoted by 'ClosestDist', and a distance of a highest scoring outcome node for the pair denoted by 'BestDist'. The values for state-outcome pairs may be determined using the method 200 described in relation to FIG. 2.

Transitioning into a Highest Scoring Outcome State

The intent-based model may be used to select actions, or transitions, based on a received indication of an intent to transition the entity into a highest scoring outcome state for the outcome.

For example, the entity may currently be at state 302-1. If an indication of an intent to transition the entity into the highest scoring triangle outcome is received the following steps are performed.

The score of state 302-1 for the triangle outcome is compared with the score of the highest scoring outcome node ("BestOnPath") for the triangle outcome that can be reached from state 302-1. In this case as 0 is less than 5, a determination is made that the entity is not currently at a state from which the highest scoring outcome node for the triangle outcome is immediately available. Subsequently, one or more transitions that are available from state 302-1 are determined.

In general, a transition is selected when a transition distance (in this case denoted by 'BestDist' of the triangle outcome for the state transitioned to by the transition) is less than or equal to a current distance (in this case denoted by 'BestDist' of the triangle outcome for the current state). When multiple transitions may be selected (e.g. if multiple transitions have a transition distance less than or equal to the current distance), the transition with the lowest transition distance may be selected. Ties may be broken in any suitable manner, e.g. by random choice.

In this case, only transition 304-1 is available, and so transition 304-1 is selected, with the entity transitioning into state 302-2. With the entity in state 302-2, the score of state 302-2 for the triangle outcome is compared with the score of the highest scoring outcome node for the triangle outcome that can be reached from state 302-2. As 2 is less than 5, another determination is made that the entity is not currently at a state from which the highest scoring outcome node for the triangle outcome is immediately available. Subsequently, one or more transitions that are available from state 302-2 are determined.

If the context of the game is such that contextual transition 304-4 is not available then only transitions 304-2 and 304-5 are available from state 302-2, and the above described steps are repeated. Transition 304-2 is selected as its transition distance (which equals 1), is lower than the transition distance of transition 304-5 (which equals 2), followed by transition 304-3 so that the entity is at state 302-4.

At state 302-4, the score of state 302-4 for the triangle outcome is compared with the score of the highest scoring outcome node for the triangle outcome that can be reached from state 302-4. As these values are equal (having a value of 5), a determination is made that the entity is currently at the state from which the highest scoring outcome node for the triangle outcome is immediately available and the transition corresponding to the triangle outcome from state 302-4 is selected.

However, the context of the game may be such that when the entity is at state 302-2, contextual transition 304-4 is also available. In this case, determining one or more transitions from state 302-2 comprises determining contextual transition 304-4 in addition to transitions 304-2 and 304-5 as previously described.

When multiple transitions may be selected from a state, the distance to the highest scoring outcome nodes are compared for the states that are transitioned to by the transitions, as described above. In this case, transition 304-2 transitions the entity to state 302-3 with a distance of 1 to the highest scoring outcome node for the triangle outcome that can be reached from state 302-3. On the other hand, contextual transition 304-4 transitions the entity to state 302-4 with a distance of 0 to the highest scoring outcome node for the triangle outcome that can be reached from state 302-4. In this case as 0 is less than 1, contextual transition 304-4 is selected instead of transition 304-2, and the entity transitions directly to state 302-4.

As before, at state 302-4, the score of state 302-4 for the triangle outcome is compared with the score of the highest scoring outcome node for the triangle outcome that can be reached from state 302-4. As these values are equal, a determination is made that the entity is currently at the state from which the highest scoring outcome node is immediately available and the transition corresponding to the triangle outcome from state 302-4 is selected.

Transitioning into a Closest Outcome State

Additionally, the intent-based model may be used to select actions, or transitions, based on a received indication of an intent to transition the entity into a closest outcome state for the outcome.

For example, the entity may currently be at state 302-2. If an indication of an intent to transition the entity into the closest square outcome is received the following steps are performed.

The score of state 302-2 for the square outcome is determined. As the score for the square outcome for state 302-2 is 0, a determination is made that the entity is not currently at a state from which an outcome node for the square outcome is immediately available. Subsequently, one or more transitions that are available from state 302-2 are determined.

In general, a transition is selected when a transition distance (in this case denoted by 'ClosestDist' of the square outcome for the state transitioned to by the transition) is less than or equal to a current distance (in this case denoted by 'ClosestDist' of the square outcome for the current state). When multiple transitions may be selected (e.g. if multiple transitions have a transition distance less than or equal to the current distance), the transition with the lowest transition distance may be selected. Ties may be broken in any suitable manner, e.g. by selecting a transition which transitions to a state with the highest score for the outcome, or by random choice.

If the context of the game is such that contextual transition 304-4 is not available then only transitions 304-2 and 304-5 are available from state 302-2. Transition 304-5 is selected as its transition distance (which equals 0), is lower than the transition distance of transition 304-2 (which equals 1) and the entity transitions to state 302-1.

At state 302-1, the score of state 302-1 for the square outcome is determined. As this value is non-zero (in this case, 4), a determination is made that the entity is currently at a state from which an outcome node for the square outcome is immediately available and the transition corresponding to the square outcome from state 302-4 is selected.

However, the context of the game may be such that when the entity is at state 302-2, contextual transition 304-4 is also available. In this case, determining one or more transitions from state 302-2 comprises determining contextual transition 304-4 in addition to transitions 304-2 and 304-5 as previously described.

In this case, transition 304-2 transitions the entity to state 302-3 with a distance of 1 to the closest outcome node for the square outcome that can be reached from state 302-3. On the other hand, contextual transition 304-4 transitions the entity to state 302-4 with a distance of 0 to the closest outcome node for the square outcome that can be reached from state 302-4. Similarly, transition 304-5 transitions the entity to state 302-1 with a distance of 0 to the closest outcome for the square outcome that can be reached from state 302-1. Therefore, in this case, both transitions 304-4 and 304-5 have the same transition distance. However, state 302-4 has a higher score for the square outcome than state 302-1 and so transition 304-4 is selected instead of transition 304-5. Ties may be broken in any suitable manner, e.g. by random choice.

At state 302-4, the score of state 302-4 for the square outcome is determined. As this value is non-zero (in this case, 5), a determination is made that the entity is currently at a state from which an outcome node for the square outcome is immediately available and the transition corresponding to the square outcome from state 302-4 is selected.

Figure 4:
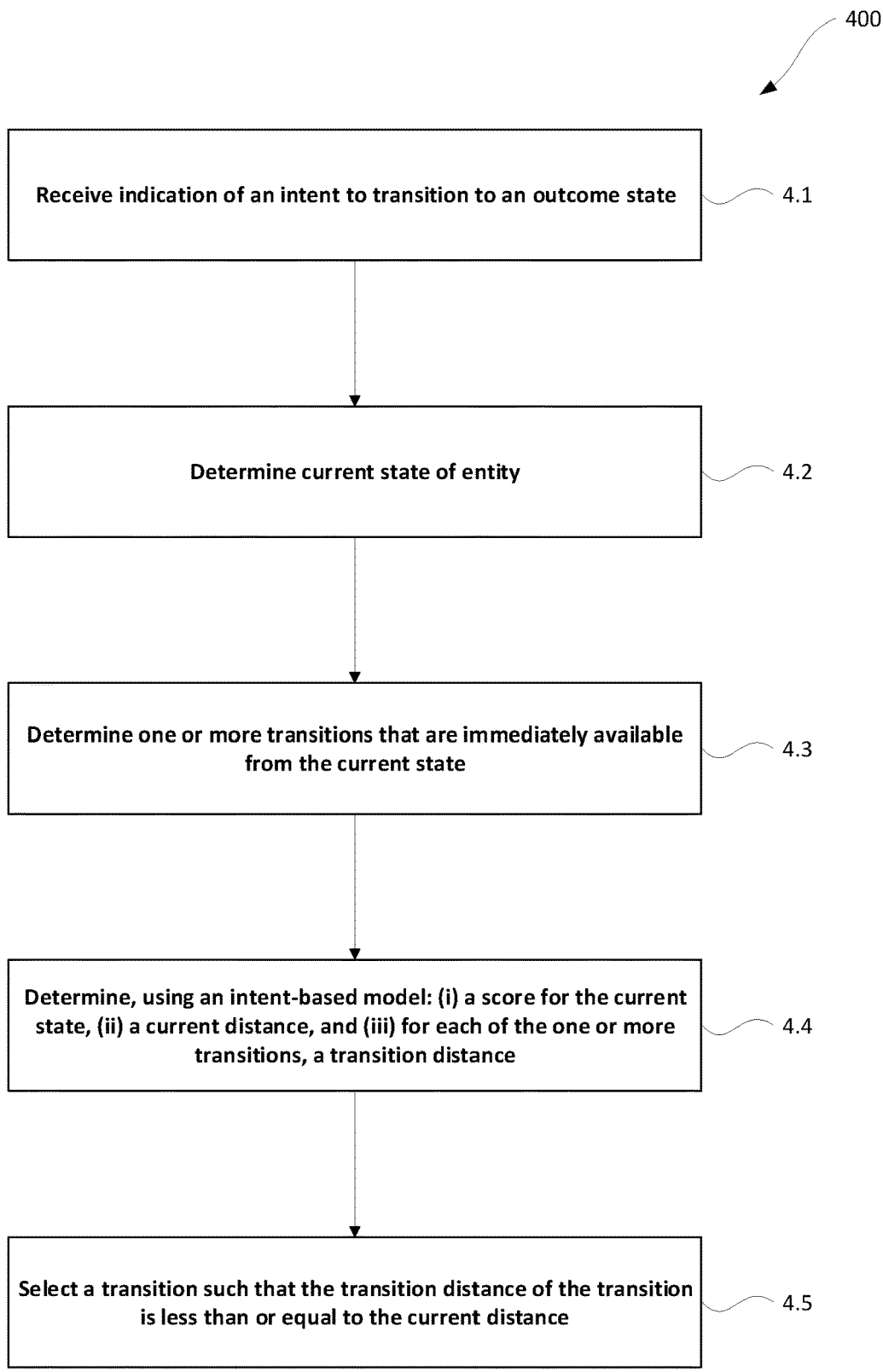
FIG. 4 shows a flow diagram of an example method of selecting actions in a video game using an intent-based model.

FIG. 4 shows a flow diagram of an example method 400 of selecting actions in a video game using an intent-based model. The method 400 shows a general overview of the methods described in relation to FIG. 3.

In step 4.1, an indication of an intent to transition to an outcome state is received. Receiving an indication of an intent to transition to an outcome state may comprise receiving an input from a player of the video game. The intent may be an intent to transition the entity into a highest scoring outcome state from the current state. Additionally or alternatively, the intent may be an intent to transition the entity into a closest outcome state from the current state.

In step 4.2, a current state of an entity is determined.

In step 4.3, one or more transitions that are immediately available from the current state are determined. The method 400 may comprise determining one or more transitions that are always available for the entity. The method 400 may further comprise determining one or more transitions that are available based on a current context of the video game.

In step 4.4, an intent-based model is used to determine: (i) a score for the current state, (ii) a current distance, and (iii) for each of the one or more transitions, a transition distance. The current distance is a distance from the current state to an outcome state corresponding to the intent. The transition distance of a transition is a distance from a state transitioned to by the transition to an outcome state corresponding to the intent.

In step 4.5, a transition is selected such that the transition distance of the transition is less than or equal to the current distance. When multiple transitions may be selected (e.g. if multiple transitions have a transition distance less than or equal to the current distance), the transition with the lowest transition distance may be selected. When multiple transitions have the same lowest transition distance, the transition which transitions into a state with the highest score for the outcome may be selected. Ties may be broken in any suitable manner, e.g. by random choice.

The method may be implemented in a fighting game. The current state of the entity may represent a current grappling position of the entity. Each of the one or more transitions may represent a movement of the entity from the current grappling position to a subsequent grappling position. The intent may comprise one of: a get up intent, wherein the get up intent is to transition to the closest get up outcome state; a submission intent, wherein the submission intent is to transition to a highest scoring submission outcome state or a closest submission outcome state; or a ground-and-pound intent, where in the ground-and-pound intent is to transition to a highest scoring ground-and-pound outcome state or a closest ground-and-pound outcome state.

Figure 5:
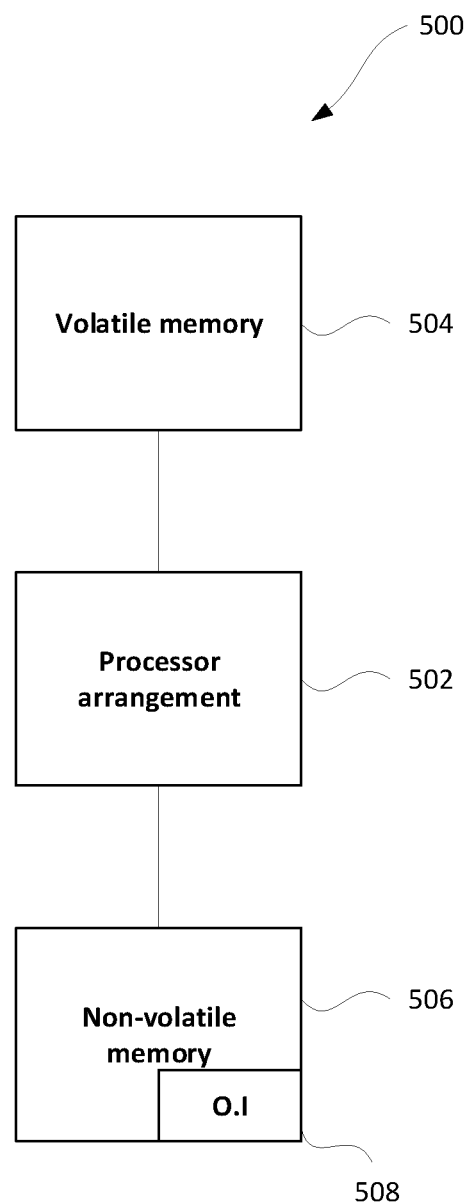
FIG. 5 shows a schematic example of a system/apparatus for performing any of the methods described herein.

FIG. 5 shows a schematic example of a system/apparatus for performing any of the methods described herein. The system/apparatus shown is an example of a computing device. It will be appreciated by the skilled person that other types of computing devices/systems may alternatively be used to implement the methods described herein, such as a distributed computing system.

The apparatus (or system) 500 comprises one or more processors 502. The one or more processors control operation of other components of the system/apparatus 500. The one or more processors 502 may, for example, comprise a general purpose processor. The one or more processors 502 may be a single core device or a multiple core device. The one or more processors 502 may comprise a central processing unit (CPU) or a graphical processing unit (GPU). Alternatively, the one or more processors 502 may comprise specialised processing hardware, for instance a RISC processor or programmable hardware with embedded firmware. Multiple processors may be included.

The system/apparatus comprises a working or volatile memory 504. The one or more processors may access the volatile memory 504 in order to process data and may control the storage of data in memory. The volatile memory 504 may comprise RAM of any type, for example Static RAM (SRAM), Dynamic RAM (DRAM), or it may comprise Flash memory, such as an SD-Card.

The system/apparatus comprises a non-volatile memory 506. The non-volatile memory 506 stores a set of operation instructions 508 for controlling the operation of the processors 502 in the form of computer readable instructions. The non-volatile memory 506 may be a memory of any kind such as a Read Only Memory (ROM), a Flash memory or a magnetic drive memory.

The one or more processors 502 are configured to execute operating instructions 508 to cause the system/apparatus to perform any of the methods described herein. The operating instructions 508 may comprise code (i.e. drivers) relating to the hardware components of the system/apparatus 500, as well as code relating to the basic operation of the system/apparatus 500. Generally speaking, the one or more processors 502 execute one or more instructions of the operating instructions 508, which are stored permanently or semi-permanently in the non-volatile memory 506, using the volatile memory 504 to temporarily store data generated during execution of said operating instructions 508.

Implementations of the methods described herein may be realised as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 5, cause the computer to perform one or more of the methods described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims.

The invention claimed is:

1. A system comprising:
   one or more processors; and
   a memory, the memory storing computer readable instructions that, when executed by the one or more processors, cause the processor to perform operations comprising:
   receiving an indication of an intent to transition an entity of a video game to an outcome state, the outcome state corresponding to an outcome out of a set of outcomes;
   determining a current state of the entity;
   determining one or more transitions that are immediately available from the current state;
   determining, using an intent-based model:
      a score for the current state;
      a current distance from the current state to an outcome state corresponding to the intent; and
      for each of the one or more transitions, a transition distance from a state transitioned to by the transition to an outcome state corresponding to the intent; and
   selecting a transition such that the transition distance of the transition is less than or equal to the current distance.

2. The system of claim 1, wherein receiving an indication of an intent to transition an entity of a video game to an outcome state, the outcome state corresponding to an outcome out of a set of outcomes comprises:
   receiving an input from a player of the video game.

3. The system of claim 1, wherein determining one or more transitions that are immediately available from the current state comprises:
   determining one or more transitions that are always available for the entity.

4. The system of claim 3, wherein determining one or more transitions that are immediately available from the current state further comprises:
   determining one or more transitions that are available based on a current context of the video game.

5. The system of claim 1, wherein the intent is to transition the entity into a highest scoring outcome state from the current state.

6. The system of claim 1, wherein the intent is to transition the entity into a closest outcome state from the current state.

7. The system of claim 1, wherein the video game is a fighting game, and:
   the current state of the entity represents a current grappling position of the entity;
   each of the one or more transitions represents a movement of the entity from the current grappling position to a subsequent grappling position; and
   the intent comprises one of:
      a get up intent, wherein the get up intent is to transition to the closest get up outcome state;
      a submission intent, wherein the submission intent is to transition to a highest scoring submission outcome state or a closest submission outcome state; or
      a ground-and-pound intent, where in the ground-and-pound intent is to transition to a highest scoring ground-and-pound outcome state or a closest ground-and-pound outcome state.

8. A method comprising:
   receiving an indication of an intent to transition an entity of a video game to an outcome state, the outcome state corresponding to an outcome out of a set of outcomes;
   determining a current state of the entity;
   determining one or more transitions that are immediately available from the current state;
   determining, using an intent-based model:
      a score for the current state;
      a current distance from the current state to an outcome state corresponding to the intent; and for each of the one or more transitions, a transition distance from a state transitioned to by the transition to an outcome state corresponding to the intent; and selecting a transition such that the transition distance of the transition is less than or equal to the current distance.

9. The method of claim 8, wherein receiving an indication of an intent to transition an entity of a video game to an outcome state, the outcome state corresponding to an outcome out of a set of outcomes comprises:

receiving an input from a player of the video game.

10. The method of claim 8, wherein determining one or more transitions that are immediately available from the current state comprises:

determining one or more transitions that are always available for the entity.

11. The method of claim 10, wherein determining one or more transitions that are immediately available from the current state further comprises:

determining one or more transitions that are available based on a current context of the video game.

12. The method of claim 8, wherein the intent is to transition the entity into a highest scoring outcome state from the current state.

13. The method of claim 8, wherein the intent is to transition the entity into a closest outcome state from the current state.

14. The method of claim 8, wherein the video game is a fighting game, and:

the current state of the entity represents a current grappling position of the entity;

each of the one or more transitions represents a movement of the entity from the current grappling position to a subsequent grappling position; and the intent comprises one of:
  a get up intent, wherein the get up intent is to transition to the closest get up outcome state;
  a submission intent, wherein the submission intent is to transition to a highest scoring submission outcome state or a closest submission outcome state; or
  a ground-and-pound intent, where in the ground-and-pound intent is to transition to a highest scoring ground-and-pound outcome state or a closest ground-and-pound outcome state.

15. A non transitory computer-readable medium storing instructions, which when executed by a processor, cause the processor to perform operations comprising:

receiving an indication of an intent to transition an entity of a video game to an outcome state, the outcome state corresponding to an outcome out of a set of outcomes;

determining a current state of the entity;

determining one or more transitions that are immediately available from the current state;

determining, using an intent-based model:
  a score for the current state;
  a current distance from the current state to an outcome state corresponding to the intent; and
    for each of the one or more transitions, a transition distance from a state transitioned to by the transition to an outcome state corresponding to the intent; and selecting a transition such that the transition distance of the transition is less than or equal to the current distance.

16. The non transitory computer-readable medium of claim 15, wherein receiving an indication of an intent to transition an entity of a video game to an outcome state, the outcome state corresponding to an outcome out of a set of outcomes comprises:

receiving an input from a player of the video game.

17. The non transitory computer-readable medium of claim 15, wherein determining one or more transitions that are immediately available from the current state comprises:

determining one or more transitions that are always available for the entity.

18. The non transitory computer-readable medium of claim 17, wherein determining one or more transitions that are immediately available from the current state further comprises:

determining one or more transitions that are available based on a current context of the video game.

19. The non transitory computer-readable medium of claim 15, wherein the intent is to transition the entity into a highest scoring outcome state from the current state.

20. The non transitory computer-readable medium of claim 15, wherein the video game is a fighting game, and:

the current state of the entity represents a current grappling position of the entity;

each of the one or more transitions represents a movement of the entity from the current grappling position to a subsequent grappling position; and the intent comprises one of:
  a get up intent, wherein the get up intent is to transition to the closest get up outcome state;
  a submission intent, wherein the submission intent is to transition to a highest scoring submission outcome state or a closest submission outcome state; or
  a ground-and-pound intent, where in the ground-and-pound intent is to transition to a highest scoring ground-and-pound outcome state or a closest ground-and-pound outcome state.

* * * * *